United States Patent [19]
Landmeier

[11] Patent Number: 5,198,623
[45] Date of Patent: Mar. 30, 1993

[54] METHOD FOR USE IN A DIGITIZER FOR DETERMINING PEN TILT

[75] Inventor: Waldo L. Landmeier, Phoenix, Ariz.

[73] Assignee: CalComp, Inc., Anaheim, Calif.

[21] Appl. No.: 799,570

[22] Filed: Nov. 27, 1991

[51] Int. Cl.$^5$ .............................................. G08C 21/00
[52] U.S. Cl. ...................................................... 178/19
[58] Field of Search .............................. 178/18, 19, 87

[56] References Cited

U.S. PATENT DOCUMENTS

| | | | |
|---|---|---|---|
| 3,873,770 | 3/1975 | Ioannou | 178/18 |
| 4,418,242 | 11/1983 | Kouno | 178/19 |
| 4,477,877 | 10/1984 | Nakamura et al. | 364/571 |
| 4,568,799 | 2/1986 | Kobayashi et al. | 178/18 |
| 4,577,057 | 3/1986 | Blesser | 178/18 |
| 4,717,793 | 1/1988 | Kobayashi | 178/18 |
| 4,928,256 | 5/1990 | Parnell et al. | 364/561 |
| 4,939,318 | 7/1990 | Watson et al. | 178/19 |

Primary Examiner—Stafford D. Schreyer
Attorney, Agent, or Firm—Cesari and McKenna

[57] ABSTRACT

A digitizer includes a tablet having an array of conductors, and a pen-shaped, coil-containing stylus. The digitizer applies an energizing signal to either the conductors or the stylus, which signal induces voltages in the other. Then, the digitizer detects the induced voltages corresponding to the conductors, which define a voltage waveform having a positive peak, a negative peak, and a zero-crossing therebetween. The digitizer corrects for pen tilt in determining stylus position on the tablet by determining a position value for the zero-crossing using voltages in a region between the positive and negative peaks of the waveform and generating a pen tilt correction value using the position value and voltages in a region outside the positive and negative peaks. Then, the pen-tilt correction value and a preferably cyclic-error-corrected value for the position of the zero-crossing are combined to yield a relatively accurate pen-tilt-compensated determination of stylus position. The pen-tilt value provided by the invention can also be used in other applications, e.g., hand-writing recognition and electronic calligraphy.

19 Claims, 3 Drawing Sheets

METHOD FOR USE IN A DIGITIZER FOR DETERMINING PEN TILT

FIELD OF THE INVENTION

This invention relates generally to digitizers used to enter and record position information in computers, and more particularly to a method for determining "pen tilt in digitizers." The invention also pertains to a method for compensating for "pen tilt" in determining the position of a stylus on a digitizer tablet.

BACKGROUND OF THE INVENTION

A known type of digitizer employs a tablet having a planar upper surface for supporting work sheets, e.g., drawings, charts, maps or the like. The tablet also has a generally planar grid of conductors underneath the work surface.

The conductor grid is composed typically of a plurality of straight, parallel, usually equi-spaced conductors extending in a horizontal or x-direction, and a plurality of straight, parallel, usually equi-spaced conductors extending in a vertical or y-direction. The rectangular portion of the tablet upper surface immediately above the conductor grid is called the "active area."

The digitizer also employs a pen-shaped pointer, commonly called a stylus. The stylus typically has an elongated, cylindrical body terminating in a conical tip. Near the tip, the stylus contains an electrical coil disposed concentrically with the central axis of the stylus body.

In generating a signal indicative of the position of the stylus, the digitizer applies an electrical signal, e.g., to the electrical coil, to induce signals in the grid conductors due to electromagnetic inductance therebetween. Then, the grid conductors are scanned by detection circuitry to yield a series of voltage pulses of various amplitudes corresponding to the location of the conductors with respect to the stylus coil. (Alternatively, in other digitizer designs, the electrical signals are applied to the grid conductors while the signals electromagnetically induced in the electrical coil are sensed.)

The voltage pulses obtained from the conductors (or, in the alternative version, from the coil) define a sinusoidal-shaped signal envelope or waveform, which can be analyzed by a computer to obtain a calculation of the position of the stylus tip on the tablet upper surface.

During use of the digitizer, an operator uses the stylus to trace, points or lines on the tablet work sheet. The digitizer regularly generates and stores data representing the positions of the stylus as it moves.

Ideally, the stylus is held during use perpendicular by to the upper surface of the tablet. In that way, the loops of the electrical coil remain generally parallel to the upper surface and directly over the tip of the stylus, thereby permitting accurate determinations of the stylus location.

Unfortunately, most users hold and move the stylus in the manner of a standard writing pen or pencil; that is, the body of the stylus is held in the fingers at some angle that is offset from the vertical. With this orientation, called "pen tilt," the stylus tip is at one point on the tablet while, due to the tilt, the "apparent" position of the stylus tip, as would be detected by the digitizer absent correction for pen tilt, is at another point on the tablet. The point on the tablet at which the stylus tip is actually located is called the "contact point."

The apparent position of the stylus is the point on the tablet corresponding to the projection of the tilted stylus central axis to the grid plane. The distance between the contact point and the apparent stylus position can be called "projection error." Unless the digitizer compensates in the position reading to account for projection error along each axis of measurement, such error could reduce significantly the digitizer's accuracy.

The problem of pen tilt in digitizers is not new, and methods for correcting it are known in the art. For instance, U.S. Pat. No. 3,873,770 issued to Ioannou discloses a method of providing digital position measurements with stylus tilt error compensation. As described in that patent, the voltage waveform from the digitizer typically has a pair of spaced characteristic peaks whose magnitudes correspond to pen tilt. The patent's technique provides an error correction quantity determined from the peak voltages. Unfortunately, under extreme conditions of pen tilt (where the peak voltages can be as much as three fold their values occurring when the stylus is normal to the tablet), conventional detection-circuitry amplifiers can saturate and clip the waveform peaks, thereby compromising the results of that patent's approach.

Commonly-assigned U.S. Pat. No. 4,939,318 (Watson) discloses another method of detecting and correcting for pen tilt in a digitizer. The approach disclosed in the Watson patent determines pen tilt correction by comparing the magnitudes of an induced signal waveform at "points" (i.e., voltages corresponding to specific conductors, or, simply stated, conductor voltages) at fixed distances on either side of the apparent pen position, and inside the waveform peaks mentioned above with respect to the Ioannou patent.

The technique taught in the Watson patent is generally satisfactory in compensating for pen tilt, particularly in digitizers having tablets employing inter-conductor spacings (i.e., the distance between the conductors in the x-direction or y-direction) up to a maximum of about 0.3 inch (0.7 cm).

The Watson approach encounters problems, however, in digitizer tablets having larger inter-conductor spacings. It has been determined empirically that, with a coil diameter of a fraction of an inch as is typically found in a stylus, the waveform peaks lie about one inch (2.54 cm) apart. With that the case, use of the Watson technique with tablets having larger inter-conductor spacings than about 0.3 inch typically yield insufficient data between the peaks of the waveform for accurate, pen-tilt-compensated determinations of stylus position.

SUMMARY OF THE INVENTION

Briefly, the invention resides in a method of determining pen-tilt-compensated positions of a stylus on a digitizer tablet, which uses voltage waveform points occurring between as well as outside the peak voltages While the invention permits the use of tablets having inter-conductor spacings greater than about 0.3 inch, such as, for example, about 0.4 inch (1 cm.), it can also be practiced with tablets having smaller inter-conductor spacings, and, in either case, usually avoids the difficulties of the prior art associated with the peak voltages.

Central to the invention is the recognition that the voltages outside the peak voltages of the waveform vary with pen tilt in a consistent and useful manner that can be used in compensating for that condition in stylus position determinations.

More specifically, the digitizer applies an energizing signal to either the conductors or the stylus, which signal induces a voltage in the other. Then, the digitizer detects the induced voltages corresponding to the conductors, which define a voltage waveform having a positive peak, a negative peak, and a zero-crossing therebetween.

The digitizer corrects for pen tilt in stylus position determinations by first computing a position value for the zero-crossing by applying preferably linear interpolation techniques to conductor voltages in a region between the positive and negative peaks of the waveform. Preferably, the digitizer uses for these purposes the voltages corresponding to the conductors next adjacent the zero-crossing on both sides (i.e., conductors $a_0$ and $b_0$).

Then, the digitizer generates a pen-tilt-indicating value using the just-calculated zero-crossing position value and preferably linear interpolation techniques applied to conductor voltages in a region outside the positive and negative peaks, e.g., applied to the voltages preferably corresponding to the pair of conductors next following $a_0$ and $b_0$ on each side of the zero-crossing.

Subsequently, the pen-tilt indicating value and a preferably cyclic-error-corrected value for the position of the zero-crossing are combined to yield a relatively accurate pen-tilt-compensated determination of stylus position.

Alternatively, the pen-tilt indicating value generated by the invention can be used in many applications in and of itself. For instance, this value can be used in security systems employing handwriting recognition to identify personnel, e.g., by the characteristic angle at which individuals hold writing instruments. It can also be used in electronic calligraphy to determine line thickness of the lettering as a function of the angle of the pen. Thus, pen tilt is not always a problem to be corrected as described hereinabove, but rather a parameter that can provide useful information. The invention can be used to determine pen tilt for any such purposes.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENT

Figure 1:
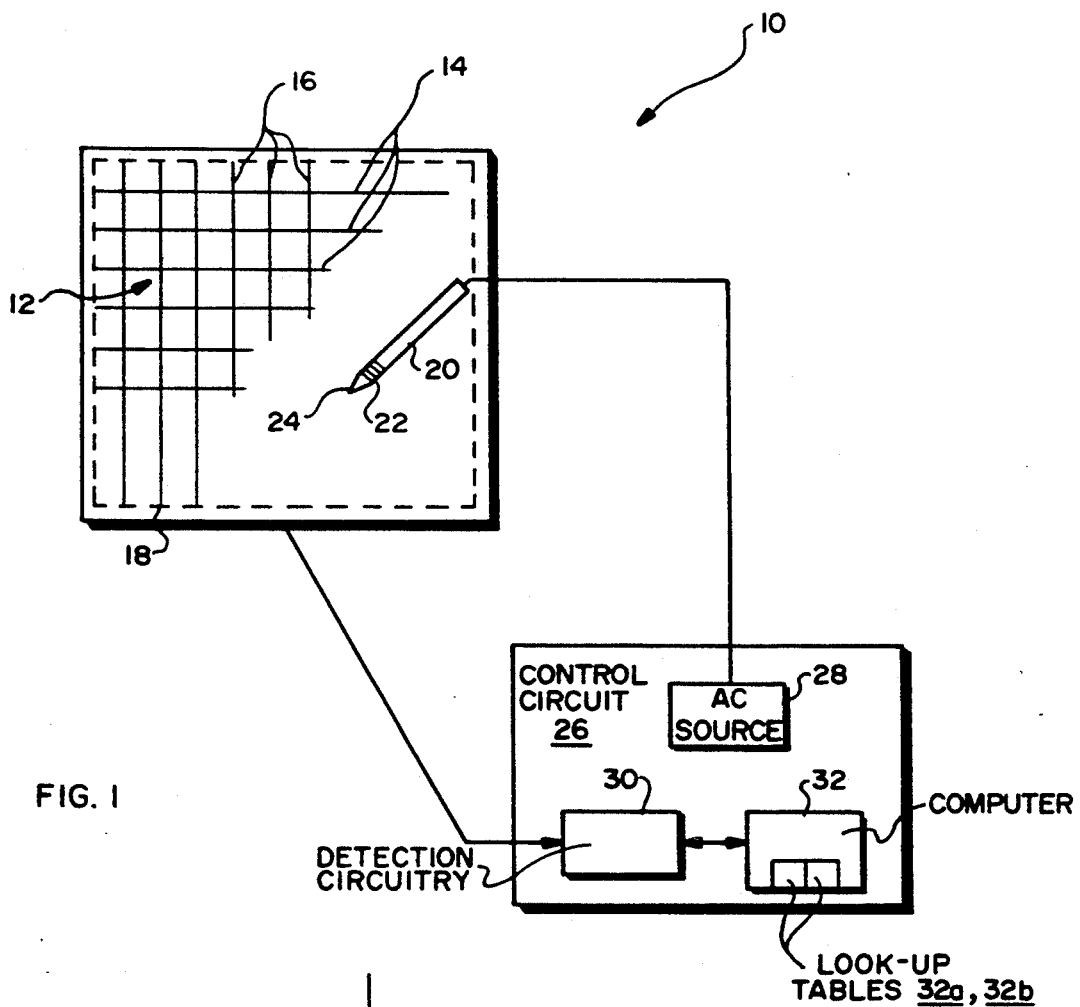
FIG. 1 is a representation, partially in block diagram form, of a digitizer in accordance with the invention.

In FIG. 1, a digitizer 10 has a tablet 12 including a conductor grid or array 13 composed of a set of parallel, equi-spaced conductors 14 extending in the horizontal or x-direction, and a set of parallel, equi-spaced conductors 16 extending in the vertical or y-direction. The conductors 14, 16 can be formed, for example, as electrical wires or paths of conductive ink disposed on a non-conductive substrate of, e.g., glass or Mylar brand material. The fabrication and layout of the conductors 14, 16 is generally conventional.

The digitizer 10 also has a conventional, movable pen-shaped stylus 20 with an electrical coil 22 disposed a short distance above its tip 24. During use, the stylus tip 24 is disposed along an upper surface 12a (see FIG. 2) of the tablet 12, immediately above the conductor grid 13. This area of the upper surface 12a is called the "active area" and designated 18 in the drawings.

In addition, the digitizer 10 has a control circuit 26. The control circuit 26 includes a conventional alternating current (AC) supply 28, conventional detection circuitry 30, and a computer or signal processor 32. The AC supply 28 energizes, e.g., the stylus coil 22, in which case, the detection circuitry 30 employs scanning logic for scanning the resulting currents induced in the conductors 14, 16. The computer 32 receives signals from the detection circuitry 28 indicative of, e.g., the magnitude and polarity of the induced currents, from which the computer computes information indicating the position of the coil 22 within the active area 16.

Figure 2:
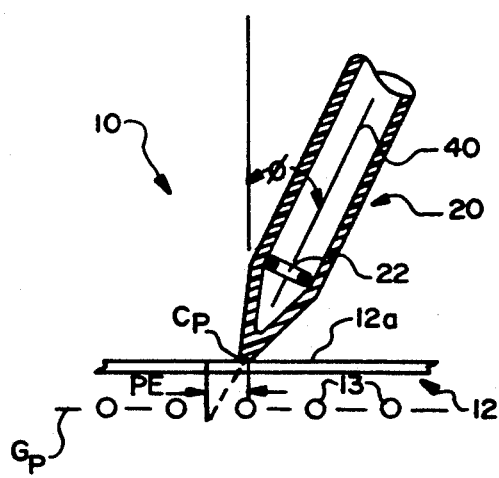
FIG. 2 is an enlarged, sectional view of a portion of the digitizer tablet and stylus of FIG. 1, which illustrates the problem of pen tilt.

FIG. 2 illustrates the problem of pen tilt. As shown, the stylus 20 is touching the upper surface of the tablet 12 at a point "$C_p$," which is the contact point. Due to pen tilt, the central axis 4 of the stylus 20 is shown offset from the perpendicular by an angle $\phi$ with respect to the upper surface 12a of the tablet 12. A downwardly-directed projection of the central axis 40 intercepts the plane "$G_p$," formed by the conductor grid 13 at a point which is offset from the contact point by a distance "PE." The digitizer 10 will normally determine that, under these conditions (and absent correction for pen tilt), the apparent position of the stylus 20 is the intercept point, and the distance "PE" between the contact point and the apparent position is the projection error or pen tilt error.

Figure 3B:
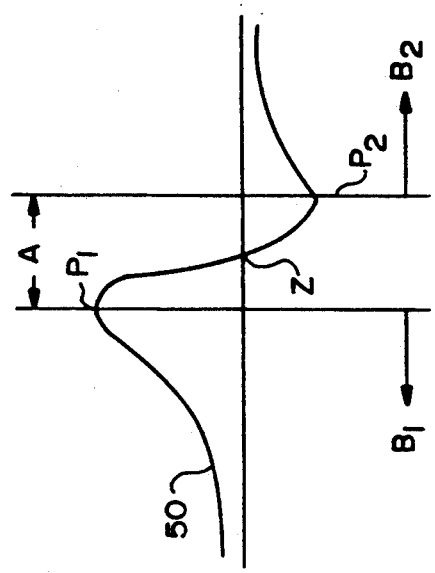
FIG. 3A-3C are graphs showing typical voltage waveforms generated by the digitizer of FIG. 1, with voltage plotted against time or distance along the tablet upper surface.
Figure 3A:
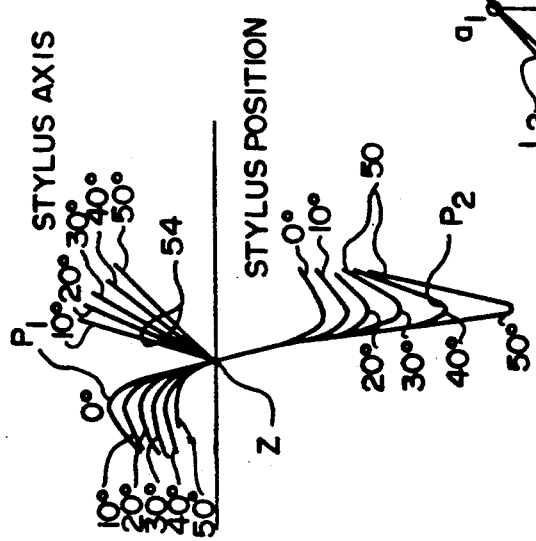
Figure 3C:
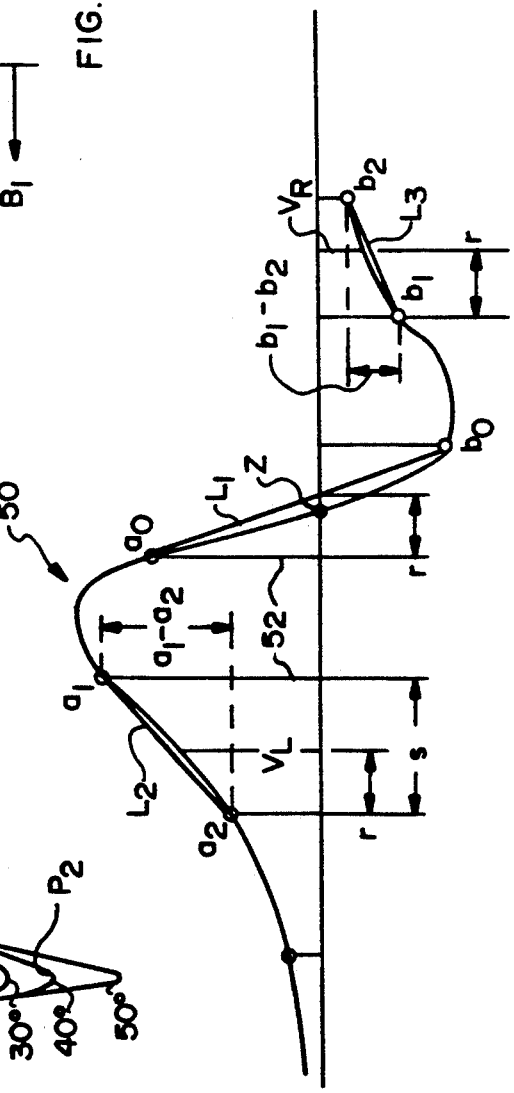

FIG. 3A-3C show typical voltage waveforms 50 generated by the computer 32. The waveforms 50 represent signal envelopes defined, in each case, by a plurality of voltage spikes 52 (FIG. 3C) induced in the conductors 14 or 16. As can be seen, each waveform is a sinusoid, having a single zero-crossing (labeled "z") at the apparent position of the stylus 12. The voltage spikes 52 (FIG. 3C) occur at regular intervals designated "s," which corresponds to the spacing between the conductors 14, 16, i.e., the inter-conductor spacing.

In FIG. 3A, a set of waveforms 50 shows that, for each different pen tilt angle, represented at 54 in the drawing, the corresponding waveform 50 has a different and characteristic shape. Note that each has a positive peak voltage "$P_1$" and a negative peak voltage "$P_2$," but that the magnitudes of the peak voltages in the curves depend on pen tilt. Indeed, with greater pen tilt angles, the positive peak voltage decreases and the negative peak voltage increases. Moreover, and this is important, the slopes of the waveforms outside the peak voltages depend on the degree of pen tilt.

More specifically, and as illustrated in FIG. 3B, each waveform 50 can be divided for discussion purposes into two regions; a first region "A" lies between (or inside) the peak voltages, and a second region "$B_1$, $B_2$" lies outside the peak voltages. Portion $B_1$ of the second region includes positive voltages located to the left of the positive peak $P_1$, and portion $B_2$ includes negative voltages to the right of negative peak $P_2$.

A more detailed discussion of the waveforms, and their role in the invention, shall now be presented with reference to FIG. 3C. For convenience, the amplitudes of the voltage spikes 52 in FIG. 3C have been designated $a_0, a_1, a_2, \ldots$ for successive conductors on one side of the zero-crossing "z," and, $b_0, b_1, b_2, \ldots$ for successive conductors on the other side. More specifically,

- "$a_0$" represents the voltage across (or corresponding to) the conductor next adjacent the zero-crossing on one side;
- "$a_1$" represents the voltage across (or corresponding to) the conductor next following "$a_0$" on the one side;
- "$a_2$" represents the voltage across (or corresponding to) the conductor next following "$a_1$" on the one side;
- "$b_0$" represents the voltage across (or corresponding to) the conductor next adjacent the zero-crossing on the other side;
- "$b_1$" represents the voltage across (or corresponding to) the conductor next following "$b_0$" on the other side;
- "$b_2$" represents the voltage across (or corresponding to) the conductor next following "$b_1$" on the other side.

The invention makes use of certain attributes of the general shape of the voltage waveform 50 to determine pen tilt compensation. Specifically, it was recognized that the waveform has a generally linear segment $L_1$ between the voltages $a_0$ and $b_0$ within region A, and two generally linear segments in region $B_1$, $B_2$, namely, segment $L_2$ located between voltages $a_1$ and $a_2$ and segment $L_3$ located between voltages $b_1$ and $b_2$.

The degree of linearity of these segments permits the invention to use linear approximation techniques to calculate values relatively easily and accurately for voltages lying between the voltages $a_0$ and $b_0$ in segment $L_1$, the voltages $a_1$ and $a_2$ in segment $L_2$, and the voltages $b_1$ and $b_2$ in the segment $L_3$.

Essentially, for this, the invention first calculates the position of the zero-crossing as an offset from voltage $a_0$, and then applies that offset and simple trigonometry to determine certain voltage values at corresponding points along $L_2$ and $L_3$. These calculated voltages are then combined, and, after suitable mathematical manipulation and calibration, can serve as an indication of pen tilt to compensate for that condition in stylus position determinations.

Reference will be made to FIG. 3C throughout the discussion that follows.

Figure 4:
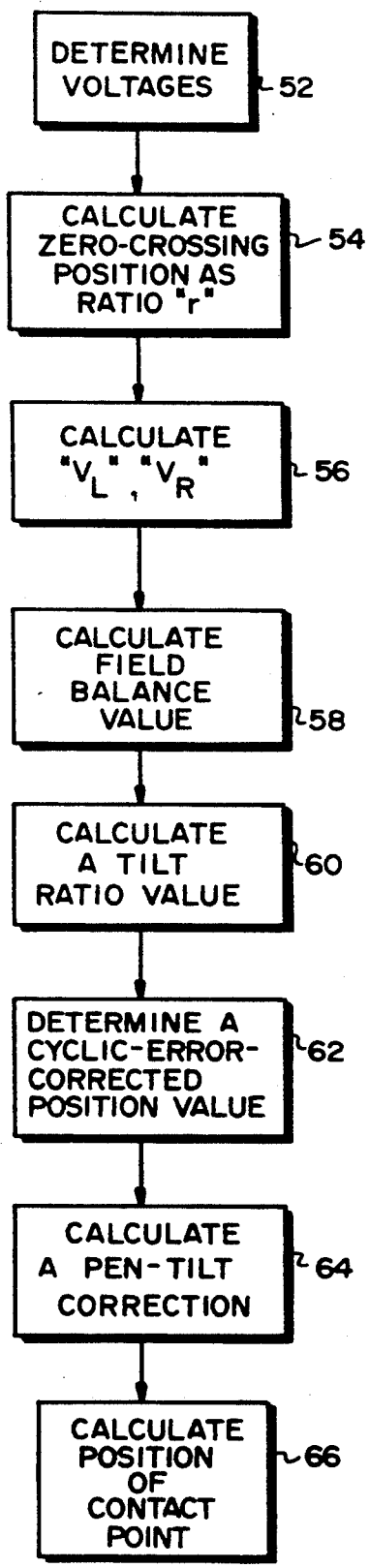
FIG. 4 is a block diagram representing a method implemented by the computer of FIG. 1 for compensating for pen tilt in stylus position determinations in accordance with the invention.

In accordance with the invention, and as illustrated in FIG. 4, the computer 32 implements a method 60 for generating stylus position information compensated for pen tilt along the lines just described. Since the method can be implemented to determine the position of the stylus 20 first in one of the x- or y-directions, and then repeated for the other direction, we will only describe the method in a single direction (i.e., a single axis), and this description will suffice for the purposes at hand. (Of course, in single-axis digitizer systems having conductors in only one direction, the method need only be executed once.)

The method begins in block 53 with the detection circuitry 30 providing the voltages $a_0, a_1, a_2, \ldots, b_0, b_1, b_2, \ldots$ induced in the conductors. (As is known in the art, the voltages are the direct current (DC) equivalents of the actual voltages measured on the conductors.)

In block 54, the computer 32 uses the voltages provided by the detection circuitry 30 in determining the position of the zero-crossing "z" (i.e., the apparent position of the stylus). This position is calculated preferably by linear interpolation between conductor voltages $a_0$ and $b_0$, and is expressed as a ratio of those voltages in accordance with the following equation:

$$r = a_0/(a_0+b_0) \quad \text{Equation 1}$$

where "r" indicates the position of the zero-crossing, which can be called the "zero-crossing ratio."

In block 56, the computer 32 uses "r" to calculate a voltage value ("$v_L$") along the waveform 50 that is "2s" (i.e., twice the inter-conductor spacing) to the left (i.e., to the first side) of the zero-crossing "z." The voltage "$v_L$" is calculated preferably using linear interpolation techniques with respect to the conductor voltages $a_1$ and $a_2$, generally in accordance with the following equation:

$$v_L = a_2 + (a_1 - a_2)^* r \quad \text{Equation 2}$$

Similarly, the computer calculates the voltage value ("$v_R$") along the waveform that is "2s" to the right (i.e., the other side) of the zero-crossing, as follows:

$$v_R = b_1 - (b_2 - b_1)^* r \quad \text{Equation 3}$$

Subsequently, in block 58, the computer 32 calculates a quantity called a field balance value ("$f_b$"). The field balance value can be expressed as a ratio of the voltage value along the waveform, which occurs "2s" to the left of the zero-crossing, to the voltage value "2s" to the right of the zero-crossing, that is $$f_b = v_R/v_L \quad \text{Equation 4}$$

Then, in block 60, the computer 32 converts the field balance value to a tilt ratio ("$t_r$"). The tilt ratio has a value between $-1$ and $+1$, with, for example, a zero value for the tilt ratio representing no pen tilt, negative values representing tilt to the left, i.e., to the first side, of the zero-crossing and positive values representing tilt to the right, i.e., to the other side. It will be apparent that a tilt ratio value of $-1$ or $+1$ represents the maximum pen tilt.

A preferred approach to convert the field balance value to a tilt ratio is to use the field balance value in accessing a look-up table or directory 32a (FIG. 1) stored in the computer's memory. The look-up table 32a contains a plurality of empirically determined tilt ratio values, each corresponding to a range of field balance values. Thus, to access the table 32a, the computer 32 first determines the field-balance range which contains a particular field balance value, and then fetches the tilt ratio entry corresponding to that range.

The entries in look-up table 32a can be developed empirically for any particular digitizer. This is achieved by testing the particular digitizer using known stylus angles (e.g., 10°, 20°, 30°, etc.), and thus known tilt ratios that correspond to those angles, and then calculating the field balances in accordance herewith that correspond to those angles and tilt ratios. To save memory space, only positive values for the tilt ratios need be stored, and the computer 32 can determine the required sign.

Having obtained the tilt ratio value, the computer 32 next, in block 62 of the drawing, corrects for what is known in the art as cyclic errors. Errors of this type can arise out of the approximations used during the calculation steps described above. Since cyclic errors typically are directly related to the inter-conductor spacing, greater spacing can result in larger cyclic errors. Accordingly, it becomes increasingly important to correct for cyclic error as interconductor spacings increase above about 0.3 inch (0.7 cm). In some digitizers 10 having smaller inter-connector spacings, on the other hand, cyclic error need not be corrected in obtaining a sufficiently accurate determination of stylus position for many applications.

A preferred approach to correcting for cyclic error is to use the tilt ratio value in accessing a two-dimensional lookup table 32b (FIG. 1) stored in the computer's memory. The look-up table 32b contains a plurality of empirically determined cyclic-error values, arranged, e.g., in rows corresponding to selected tilt ratio values ("$t_r$"), and columns corresponding to selected values of zero-crossing ratios ("r").

The table 32b is accessed by referencing a particular row and column using the calculated tilt ratio value and calculated zero-crossing ratio, and interpolating (e.g., linearly) wherever necessary between entries in the two rows or columns that bracket the calculated value to yield a specific cyclic-error correction value. Typically, in most cases, this correction value will be obtained using interpolation between four adjacent table entries. Then, the computer 32 subtracts this value from the zero-crossing ratio ("r") to yield a cyclic-error-corrected position value, "$r_c$."

In block 64 of FIG. 4, the computer 32 generates a pen-tilt correction value "$P_E$" by multiplying an empirically-derived maximum pen-tilt-error constant ("$(P_E)_{max}$") by the calculated tilt ratio, "$t_r$." This is expressed mathematically as follows:

$$P_E = (P_E)_{max} \cdot t_r \qquad \text{Equation 5}$$

A suitable value for $(P_E)_{max}$ can be determined by running a test on digitizer 10 to determine the pen-tilt error that would result from a realistic value for the maximum angle at which the stylus could be tilted during typical use, e.g., sixty degrees. This pen tilt error can then be used as the maximum pen-tilt error during use of the digitizer.

Finally, in block 66, the calculated pen-tilt correction "$P_E$" is subtracted from the calculated cyclic-error-corrected position value $r_c$ to yield relatively accurate information indicating the position of the contact point of the stylus 20, which we will designate "$c_p$." Thus, the result of these series of steps is given by the following equation:

$$c_p = r_c - P_E \qquad \text{Equation 6}$$

Accordingly, the invention provides an improved method for use in a digitizer for compensating for pen tilt in determining stylus position.

Alternatively, the pen-tilt value $P_E$ can be used to indicate the angle of the stylus in many applications other than in pen-tilt compensation of stylus-position determinations. For instance, this value can be used in handwriting recognition systems, as a parameter in personnel identification, or in electronic calligraphy for determining line thickness. In determining $P_E$ for these applications, the method of FIG. 4 can be followed, with the omission of the steps shown in blocks 62 and 66. The resulting value for these purposes can be more generally called a pen-tilt indicating value.

The foregoing description has been limited to a specific embodiment of this invention. It will be apparent, however, that variations and modifications may be made to this embodiment to attain some or all of its advantages.

For instance, it should be apparent that while the information obtained by the present invention for the pen-tilt correcting or indicating value and for the position of the contact point is usually sufficiently accurate for most applications, it nonetheless is still an approximation. Those skilled in the art may find it advantageous in particular applications to use other methods of computing the values that were obtained above through linear interpolation.

Moreover, while the illustrative embodiment uses a computer that implements many of the steps of the described method preferably in the form of software instructions, the steps can also be implemented by firmware or hardware.

Therefore, it is the object of the appended claims to cover all such variations and modifications as come within the true spirit and scope of the invention as set forth in the appended claims.

What is claimed is:

1. In a digitizer including a tablet having an array of conductors, and a pen-shaped, coil-containing stylus, a method for determining a pen-tilt indicating value representing the angle of said stylus on said tablet, said method comprising:

A) applying an energizing signal to either said conductors or said stylus, which signal induces voltages in the other corresponding to said conductors;

B) detecting said induced voltages, which define a voltage waveform having a positive peak, a negative peak, and a zero-crossing therebetween;

C) determining a position value for said zero-crossing using voltages in a region between said positive and negative peaks of said waveform; and D) generating said pen-tilt indicating value using said position value and voltages in a region outside said positive and negative peaks.

2. The method for determining a pen-tilt indicating value in accordance with claim 1, wherein steps (C) and (D) include linear interpolation of voltage values in the respective regions of said voltage waveform.

3. The method for determining a pen-tilt indicating value in accordance with claim 1, wherein step (C) comprises the step of calculating a zero-crossing position value "r" in terms of the voltage "$a_0$" corresponding to the conductor next adjacent said zero-crossing on one side, and the voltage "$b_0$" corresponding to the conductor next adjacent said zero-crossing on the other side.

4. The method for determining a pen-tilt indicating value in accordance with claim 3, wherein said zero-crossing-position-value calculating step includes the step of calculating said zero-crossing position value generally in accordance with the equation:

$$r = a_0/(a_0 + b_0).$$

5. The method for determining a pen-tilt indicating value in accordance with claim 4, wherein step (D) includes the steps of (i) calculating a field balance value $f_b$ generally in accordance with the equation $$f_b = v_R/v_L$$

Where $$v_L = a_2 + (a_1 - a_2)^* r$$

and $$v_R = b_1 - (b_2 - b_1)^* r$$

and where

"$a_1$" represents the voltage corresponding to the conductor next following "$a_0$" on the one side;
"$a_2$" represents the voltage across the conductor next following "$a_1$" on the one side;
"$b_1$" represents the voltage across the conductor next following "$b_0$" on the other side; and
"$b_2$" represents the voltage across the conductor next following "$b_1$" on the other side;

(ii) converting said field balance value to a tilt ratio ("$t_r$"); and (iii) generating a pen-tilt indicating value "$P_E$" by multiplying a maximum pen-tilt-error constant ("$(P_E)_{max}$") by said tilt ratio.

6. In a digitizer including a tablet having an array of conductors, and a pen-shaped, coil-containing stylus, a method of determining a pen-tilt-compensated position for said stylus on said tablet, said method comprising the steps of A) applying an energizing signal to either said conductors or said stylus, which signal induces voltages in the other corresponding to said conductors;

B) detecting said induced voltages, which define a voltage waveform having a positive peak, a negative peak, and a zero-crossing therebetween;

C) correcting for pe tilt in determining stylus position on said tablet by determining a position value for said zero-crossing using voltages in a region between said positive and negative peaks of said waveform, and generating a pen tilt correction value using said position value and voltages in a region outside said positive and negative peaks; and D) combining said pen-tilt correction value and said zero-crossing position value to yield a relatively accurate pen-tilt-compensated determination of stylus position.

7. In a digitizer including a tablet having an array of conductors, and a pen-shaped, coil-containing stylus, a method of determining a pen-tilt-compensated position for said stylus on said tablet, said method comprising:

A) applying an energizing signal to either said conductors or said stylus, which signal induces voltages in the other corresponding to said conductors;

B) detecting said induced voltages, which define a voltage waveform having a positive peak, a negative peak, and a zero-crossing therebetween;

C) correcting for pen tilt in determining stylus position on said tablet by determining a position value for said zero-crossing using voltages in a region between said positive and negative peaks of said waveform, and generating a pen tilt correction value using said position value and voltages in a region outside said positive and negative peaks; and D) using said position value in generating a cyclic-error-corrected value for the position for said zero-crossing; and E) combining said pen-tilt correction value and said cyclic-error-corrected value for the position of said zero-crossing to yield a relatively accurate pen-tilt-compensated determination of stylus position.

8. Using a digitizer comprising a) a tablet having a plurality of parallel conductors having a pre-determined inter-conductor spacing; and b) a pen-shape stylus having an elongated body with a central axis and terminating in a stylus tip, and an electrical coil disposed concentric with said central axis and in said body near said stylus tip; a method for determining the stylus position on said tablet which compensates for pen tilt, said method comprising:

A) applying an energizing signal to one of said conductors and stylus, which signal induces voltages corresponding to said conductors in the other of said stylus and conductors;

B) detecting said induced voltages, wherein said induced voltages define a voltage waveform having a positive peak, a negative peak, and a zero-crossing therebetween;

C) using voltages in a region between said positive and negative peaks in generating position information indicating the position along said waveform of said zero-crossing;

D) using voltages in a region outside said positive and negative peaks in generating a pen tilt correction;

E) combining said position information and said pen tilt correction to yield a pen-tilt-corrected indication of stylus position on said tablet.

9. The method for determining said stylus position on said tablet which compensates for pen tilt in accordance with claim 8, wherein steps (C) and (D) include linear interpolation of voltage values in the respective regions of said voltage waveform.

10. The method for determining said stylus position on said tablet which compensates for pen tilt in accordance with claim 8, wherein step (C) comprises the step of calculating a zero-crossing position value "r" in terms of the voltage "$a_0$" corresponding to the conductor next adjacent said zero-crossing on one side, and the voltage "$b_0$" corresponding to the conductor next adjacent said zero-crossing on the other side.

11. The method for determining said stylus position said tablet which compensates for pen tilt in accordance with claim 10, wherein said zero-crossing-position-value calculating step includes the step of calculating said zero-crossing position value generally in accordance with the equation:

$$r = a_0/(a_0 + b_0).$$

12. The method of determining said stylus position on said tablet which compensates for pen tilt in accordance with claim 10, wherein step (D) includes the steps of (i) calculating a field balance value $f_b$ generally in accordance with the equation $$f_b = v_R/v_L$$

Where $$v_L = a_2 + (a_1 - a_2)^* r$$

and $$v_R = b_1 - (b_2 - b_1) * r$$

and Where

"$a_1$" represents the voltage corresponding to the conductor next following "$a_0$" on the one side;

"$1_2$" represents the voltage across the conductor next following "$a_a$" on the one side;

"$b_1$" represents the voltage across the conductor next following "$b_0$" on the other side; and "$b_2$" represents the voltage across the conductor next following "$b_1$" on the other side;

(ii) converting said field balance value to a tilt ratio ("$t_r$");

(iii) using said tilt ratio and said zero-crossing position value in determining a cyclic-error-corrected position value ("$r_c$"); and (iv) generating a pen-tilt correction value "$P_E$" by multiplying a maximum pen-tilt-error constant ("$(P_E)_{max}$") by said tilt ratio.

13. The method for determining said stylus position on said tablet which compensates for pen tilt in accordance with claim 12, wherein the step of determining a cyclic-error-corrected position value includes the step of using said tilt ratio and zero-crossing position value in accessing a memory storing a two-dimensional look-up table of cyclic-error-corrected position values.

14. The method for determining said stylus position on said tablet which compensates for pen tilt in accordance with claim 13, wherein step (E) includes the step of subtracting the calculated pen-tilt correction "$P_E$" from the calculated cyclic-error-corrected position value "$r_c$" to yield an indication of the position of said stylus.

15. In a digitizer including a tablet having an array of conductors, and a pen-shaped, coil-containing stylus, a method of determining a pen-tilt-compensated position for said stylus on said tablet, said method comprising:

A) applying an energizing signal to either said conductors or said stylus, which signal induces voltages in the other corresponding to said conductors;

B) detecting said induced voltages, which define a voltage waveform having a positive peak, a negative peak, and a zero-crossing therebetween;

C) compensating for pen tilt in determining stylus position on said tablet by (i) calculating a zero-crossing position value "r" in terms of the voltage "$a_0$" corresponding to the conductor next adjacent said zero-crossing on one side, and the voltage "$b_0$" corresponding to the conductor next adjacent said zero-crossing on the other side, and generally in accordance with the equation: $r = a_0/(a_0 + b_0)$;

(ii) calculating a field balance value $f_b$ generally in accordance with the equation $$f_b = v_R/v_L$$

where $$v_L = a_2 + (a_1 - a_2) * r$$

and $$v_R = b_1 - (b_2 - b_1) * r$$

and where

"$a_1$" represents the voltage corresponding to the conductor next following "$a_0$" on the one side;

"$a_2$" represents the voltage across the conductor next following "$a_1$" on the one side;

"$b_1$" represents the voltage across the conductor next following "$b_0$" on the other side; and "$b_2$" represents the voltage across the conductor next following "$b_1$" on the other side;

(iii) converting said field balance value to a tilt ratio ("$t_r$");

(iv) using said tilt ratio and said zero-crossing position value in determining a cyclic-error-corrected position value ("$r_c$");

(v) generating a pen-tilt correction value "$P_E$" by multiplying a maximum pen-tilt-error constant ("$(P_E)_{max}$") by said tilt ratio, and (vi) subtracting the calculated pen-tilt correction "$P_E$" from the calculated cyclic-error-corrected position value "$r_c$" to yield a pen-tilt compensated indication of the position of said stylus.

16. A digitizer comprising:

A) a tablet having an array of conductors;

B) a pen-shaped stylus having a coil therein;

C) means for applying an energizing signal to either said conductors or said stylus, which signal induces voltages in the other corresponding to said conductors;

D) means for detecting said induced voltages, which define a voltage waveform having a positive peak, a negative peak, and a zero-crossing therebetween; and E) computer means for determining a position value for said zero-crossing using voltages in a region between said positive and negative peaks of said waveform, and for generating a pen-tilt indicating value using said position value and voltages in a region outside said positive and negative peaks, said pen-tilt indicating value representing the angle of said stylus on said tablet.

17. The digitizer in accordance with claim 16, wherein the computer means determines the zero-crossing-position value by calculating a zero-crossing position value "r" in terms of the voltage "$a_0$" corresponding to the conductor next adjacent said zero-crossing on one side, and the voltage "$b_0$" corresponding to the conductor next adjacent said zero-crossing on the other side.

18. The digitizer in accordance with claim 16, wherein the computer means determines the zero-crossing-position value by calculating said value generally in accordance with the equation:

$$r = a_0/(a_0 + b_0).$$

19. The digitizer in accordance with claim 16, wherein the computer means further includes (i) means for calculating a field balance value $f_b$ generally in accordance with the equation $$f_b = v_R/v_l$$

Where $$v_L = a_2 + (a_1 - a_2) * r$$

and $$v_R = b_1 - )(b_2 - b_1) * r$$

and where

"$a_1$" represents the voltage corresponding to the conductor next following "$a_0$" on the one side;

"$a_2$" represents the voltage across the conductor next following "$a_1$" on the one side;

"$b_1$" represents the voltage across the conductor next following "$b_0$" on the other side; and "$b_2$" represents the voltage across the conductor next following "$b_1$" on the other side;

(ii) means for converting said field balance value to a tilt ratio ("$t_r$"); and (iii) means for generating a pen-tilt indicating value "$P_E$" by multiplying a maximum pen-tilt-error constant ("$(P_E)_{max}$") by said tilt ratio.

* * * * *